O. H. FISK.
MITER BOX.
APPLICATION FILED JULY 16, 1915.
1,184,732.
Patented May 30, 1916.
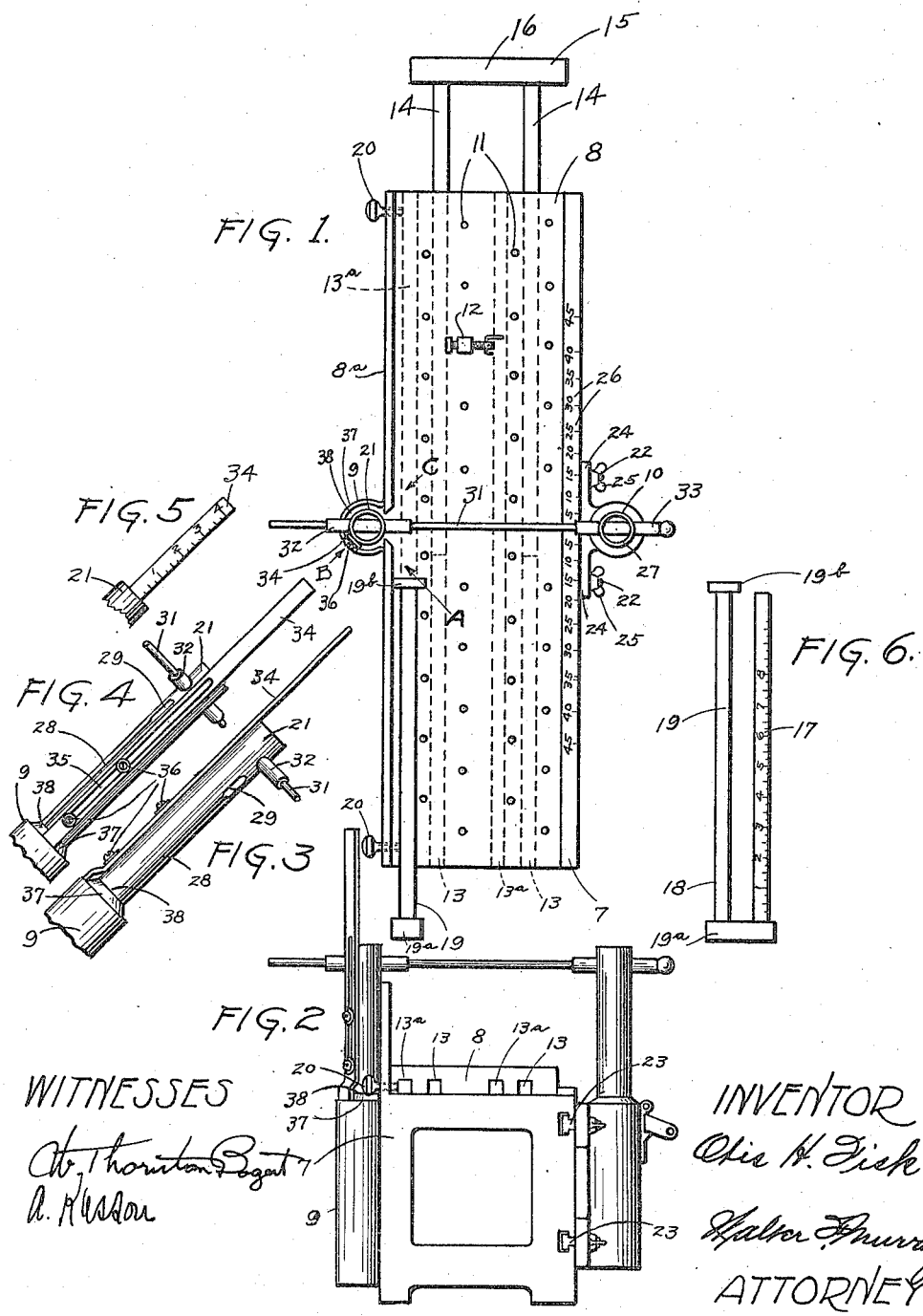

UNITED STATES PATENT OFFICE.

OTIS H. FISK, OF CINCINNATI, OHIO.

MITER-BOX.

1,184,732. Specification of Letters Patent. Patented May 30, 1916.

Application filed July 16, 1915. Serial No. 40,170.

*To all whom it may concern:*

Be it known that I, OTIS H. FISK, a citizen of the United States of America, and resident of Cincinnati, county of Hamilton, State of Ohio, have invented certain new and useful Improvements in Miter-Boxes, of which the following is a specification.

This invention relates to improvements in miter boxes and has for an object to produce a miter box in which improved means are employed for measuring the length of the piece to be cut.

A further object is to produce a miter box in which improved means are employed for limiting the depth of the saw cut.

A further object is to produce an improved miter box in which means are provided for supporting work of greater length than would be supported by the work-supporting table of the miter box.

A further object is to produce an improved miter box in which means are employed for preventing the saw dust from collecting upon and thereby causing binding and wearing of the moving parts of the miter box.

These and other objects are attained in the miter box described in the following specification and illustrated in the accompanying drawings, in which;

Figure 1 is a plan view of the miter box embodying my invention. Fig. 2 is an end elevation of the miter box illustrated in Fig. 1, with certain portions removed for convenience of illustration. Fig. 3 is a fragmental elevational view looking in the direction of the arrow A in Fig. 1. Fig. 4 is a fragmental elevational view looking in the direction of the arrow B in Fig. 1. Fig. 5 is a fragmental elevational view looking in the direction of the arrow C in Fig. 1. Fig. 6 is a side elevation of the length gage of the miter box embodying my invention.

The miter box herein described and illustrated in the accompanying drawings embodies a construction similar to that shown and described in my Patent Number 1,026,086, granted May 14, 1912, and comprises a frame 7 having a bed 8 mounted thereon, with saw guide support sleeves 9 and 10 located on the sides of the frame. The table 8 is preferably made of wood so that when the piece which is being operated upon is cut through, the teeth of the saw will not be injured by coming into contact with the surface of the table. In the face of the table and extending therethrough, are a series of apertures 11 adapted to receive clamps 12 in convenient adjusted positions for holding the work mounted on the table, as described in my above mentioned patent. In addition to these apertures extending from the top face to the bottom face of the table, are a series of longitudinally extending holes 13 adapted to receive correspondingly shaped rods 14 of extensible work supports 15, the head 16 of each one of which is provided for supporting the work mounted on the table. Two sets of longitudinal bores or holes are provided, the set 13 being provided to receive the adjustable work support 15 and another set $13^a$ being provided to receive the same or an additional work support mounted at the other end of the table. The top surface of the block or head 16 is so mounted as to be in a plane with the top of the table 8 and each support is adjustable in the holes 13 for the purpose of adapting the miter box to support work of varying lengths.

In addition to receiving the work supports the holes $13^a$ are adapted to receive the correspondingly shaped bar 17 of a length gage 18, the graduated bar 19 of which is located above the table and adapted to indicate the length of the work to be cut off. This length gage is so constructed that it may be used either when the work supports are mounted in the holes of the table, or as shown in Fig. 1 when only one work support is in position. For the purpose of securing the length gage against displacement from its adjusted position, I have provided clamping screws 20 mounted at each end of the table and adapted to engage the bar 17 of the gage when it is located in its proper hole $13^a$ at either end of the miter box and adjacent to the back plate $8^a$ of the frame. In using the length gage the distance from the inner surface of the block $19^a$ to the end of the table, as indicated on the graduated bar 19, gives the length of the piece to be cut off when its end is brought into engagement with the block $19^b$ at the opposite end of the bar 19.

The sleeve 9 is preferably built as a part of the frame casting of the miter box and is adapted to support the saw guide 21 in such a manner that the guide may rotate in the sleeve as well as reciprocate longitudinally of it. The sleeve 10 is however, movably mounted on the front of the frame 7 by means of two T headed bolts 22 mounted in T slots 23 formed in the front face of the frame and extending longitudinally thereof. The threaded ends of these T headed bolts 22 pass through flanges 24 formed as an integral part of the sleeve 10, and are adapted to be tightened by means of thumb nuts 25 to hold the sleeve in its adjusted positions along the front of the frame. The sleeve 10 is provided with a mark adapted to register with graduations 26 provided on the top edge of the frame, for the purpose of indicating the angle to which the saw guide 27 mounted in the sleeve 10, is moved with relation to the saw guide 21 mounted in the sleeve 9. This construction and manner of adjustably mounting the sleeve 10 as well as the saw guides in their respective sleeves, is more specifically described in my above referred to patent. Each saw guide is provided with a slot 28 adapted to receive the blade of a miter or back saw and having an enlarged portion 29 at its upper end adapted to receive the reinforcing back of the saw. For the purpose of keeping these slots in the saw guides in alinement, a rod 31 is passed through sleeves 32 and 33 mounted at the upper ends of the saw guides, the rod being mounted reciprocally in the sleeves to accommodate the increasing distance between the saw guides as their mounting sleeves are moved farther apart when increasing the angular movement of the sleeve 10 with relation to the sleeve 9. This construction is also similar to the construction disclosed in my above mentioned patent, with the exception that the sleeves 32 and 33 have been provided for rendering the rod 31 more rigid and more capable of maintaining the slots in the saw guides in perfect alinement. In addition to this the bearing in each saw guide is increased and the tendency for inaccuracy to enter into the operation of the construction after a short time is eliminated since the wear is materially reduced.

In addition to the length gage above described I have provided a depth gage for limiting the downward movement of the saw guides and consequently of the saw. By means of this gage the depth of cut in the piece is regulated and the cuts are made of uniform depth where a series of them are to be made as in dove-tailing and mortising. The depth gage consists of a bar 34 having an elongated slot 35 through which are passed screws 36 into the saw guide 21 for the purpose of adjustably securing the bar 34 in its adjusted positions. The lower end of the bar is adapted to abut a shoulder 37 formed on the sleeve 9 so that the downward movement of the saw guide 21 will be arrested when the end of the bar 34 engages the shoulder as the saw cuts through the material supported on the table 8. This will limit the downward movement of the saw and prevent it from cutting below a certain depth. The upper end of the bar 34 is graduated as shown in Fig. 5 so that when the bar is adjusted with relation to the saw guide, it will permit of the guide dropping only a predetermined distance. In this manner the depth of cut may be accurately controlled. A similar depth gage may be put upon sleeve 27. Surrounding the saw guide 21 the sleeve 9 at its upper end is provided with a conical extension 38 which inclines outwardly toward the shoulder 37 and is adapted to remove and direct any saw dust which may have accumulated on the surface of the saw guide, away from the guide, thereby preventing the saw dust from entering between the guide and the sleeve and causing it to bind in the sleeve as well as to increase the wear between the guide and the sleeve. A similar bevel is placed upon sleeve 10.

My improved miter box herein described embodies those improvements consisting of the adjustable work supports, the adjustable length gage, the adjustable depth gage, the saw dust shield, and the sleeves for mounting the slot alining rod connecting the saw guides, over the construction described in my above mentioned patent. It is apparent therefore that in the present application I am seeking protection on these improvements to the miter box construction covered in my Patent Number 1,026,086.

Having thus described my invention, what I claim is:

In combination in a miter box, a frame, a work supporting table mounted on the frame, a sleeve having a tapered end mounted on the frame adjacent to one side of the work supporting table, a saw guide rotatively mounted in and longitudinally movable of the sleeve, a second sleeve having a tapered end movably mounted on the frame adjacent to the opposite side of the table, a second saw guide rotatively mounted in and longitudinally movable of the second sleeve, means for locking the second sleeve in adjusted positions on the frame, sleeves rigidly mounted transversely in the saw guides, and a bar slidably mounted in the sleeves and connecting the guides.

In testimony whereof I have hereunto subscribed my name this 9th day of July, 1915.

OTIS H. FISK.

Witnesses:
WALTER F. MURRAY,
W. THORNTON BOGERT.